United States Patent [19]

Cohen

[11] 4,215,673
[45] Aug. 5, 1980

[54] SOLAR ENERGY COLLECTOR AND METHOD OF SOLAR ENERGY COLLECTION

[76] Inventor: Simon S. Cohen, Dr. Paizer St. No. 10/31, Haifa, Israel

[21] Appl. No.: 947,757

[22] Filed: Oct. 2, 1978

[51] Int. Cl.² .............................................. F24J 3/02
[52] U.S. Cl. .................................. 126/419; 126/422; 126/429; 126/452
[58] Field of Search ........................... 165/1; 237/1 A; 126/270, 271, 419, 421, 422, 429, 452

[56] References Cited

U.S. PATENT DOCUMENTS

| | | | |
|---|---|---|---|
| 3,997,108 | 12/1976 | Mason | 126/422 |
| 4,026,268 | 5/1977 | Bartos et al. | 126/450 |
| 4,060,195 | 11/1977 | Rapp et al. | 126/422 |
| 4,062,349 | 12/1977 | Birnbreier | 126/422 |
| 4,111,185 | 9/1978 | Swann | 126/436 |
| 4,112,920 | 9/1978 | Hillman | 126/437 |
| 4,125,107 | 11/1978 | Nurnberg | 126/422 |
| 4,129,118 | 12/1978 | Banke | 126/422 |
| 4,137,097 | 1/1979 | Kelly | 126/441 |
| 4,143,643 | 3/1979 | Gerin | 126/438 |
| 4,153,047 | 5/1979 | Dumbeck | 126/436 |

*Primary Examiner*—James C. Yeung
*Assistant Examiner*—Daniel J. O'Connor
*Attorney, Agent, or Firm*—Arnold, White & Durkee

[57] ABSTRACT

A solar energy collector has a liquid coolant path communicating with a liquid storage tank in a closed liquid loop and an air coolant path communicating with the enclosed space of a structure to be heated. A method of collecting and utilizing solar energy includes the utilization of a solar energy collector having both a liquid coolant path and an air coolant path wherein at selected times when the collector temperature is greater than about 10° to 20° F. above the temperature of the liquid in the storage tank both the liquid and the air coolant paths are utilized to heat the liquid in the storage tank and directly heat the enclosed space, respectively, and at other times only the air coolant path is utilized to directly heat the enclosed space.

3 Claims, 6 Drawing Figures

U.S. Patent   Aug. 5, 1980   Sheet 1 of 2   4,215,673
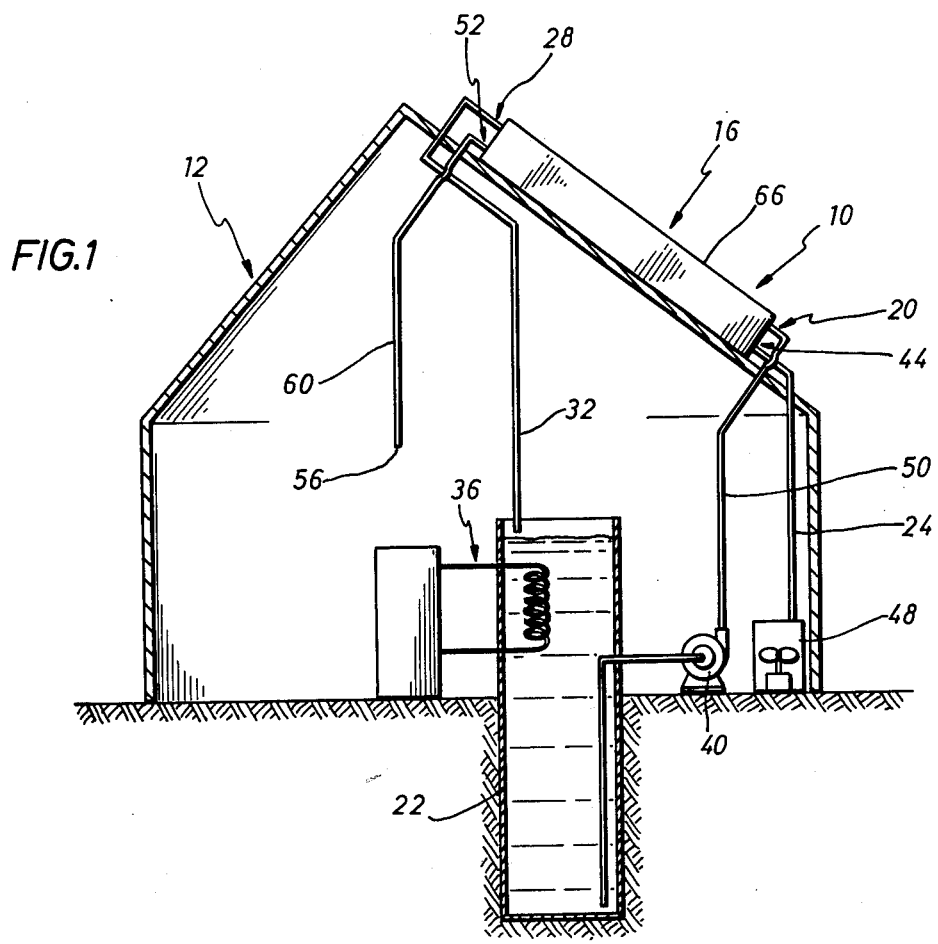
FIG.1
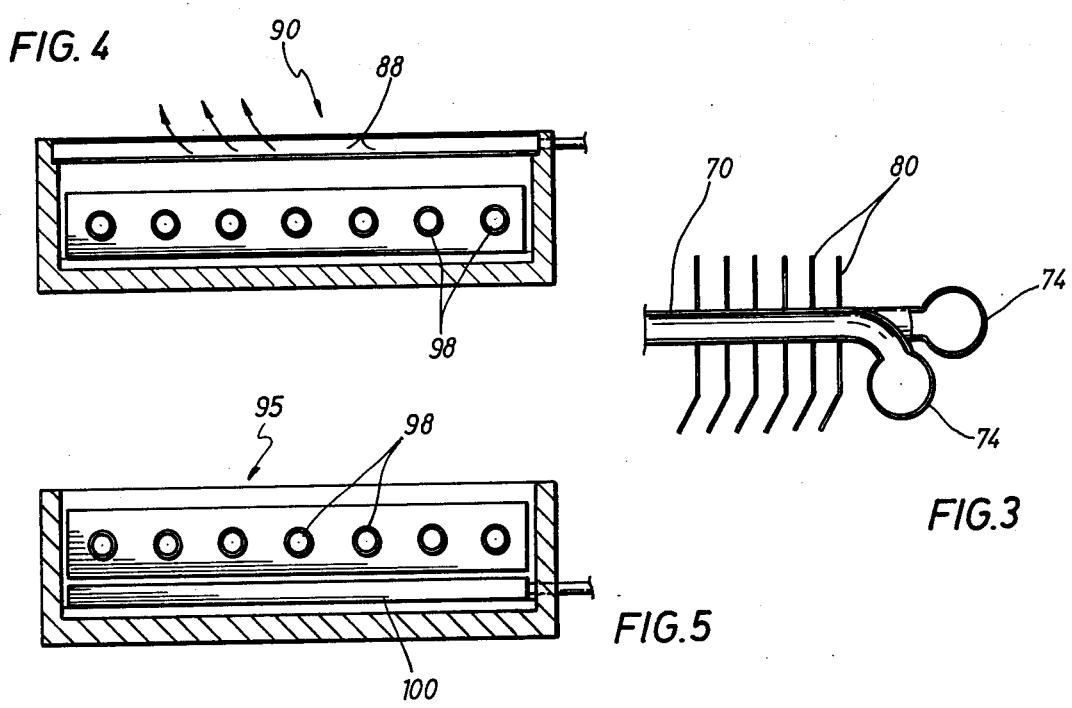
FIG. 4
FIG.3
FIG.5

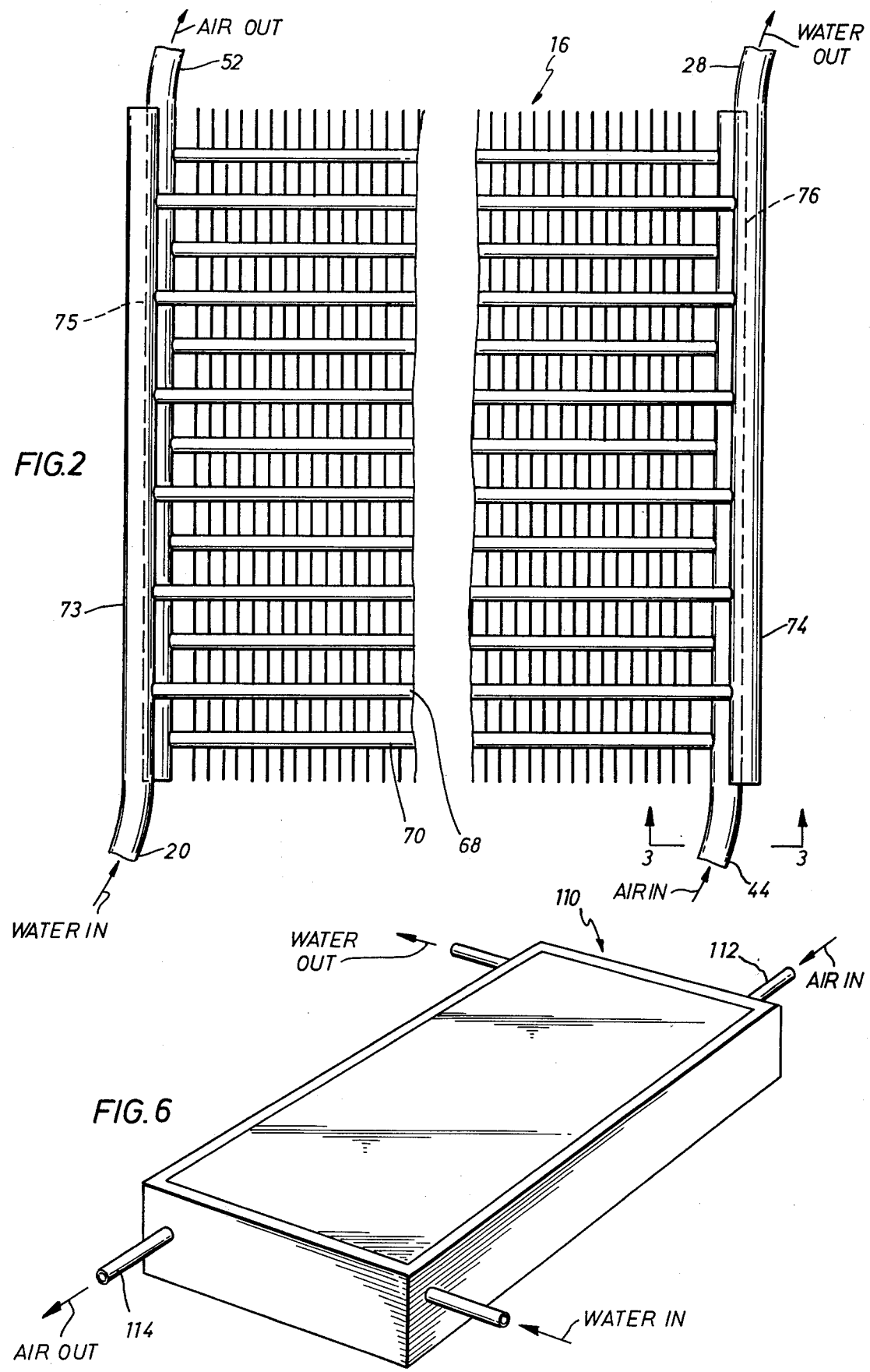

SOLAR ENERGY COLLECTOR AND METHOD OF SOLAR ENERGY COLLECTION

BACKGROUND OF THE INVENTION

1. Field of the Invention

The invention relates to solar energy collectors and methods of collecting solar energy. In particular, the invention relates to a solar energy collector having both liquid and air coolant paths and methods of using such collectors in heating the enclosed space of a structure.

2. Description of the Prior Art

It is well known that solar collectors may be utilized to collect and store energy for heating enclosed spaces, supplying hot water and the like. The efficiency of a solar collector is expressed by the equation $\eta = Q/I$ where $\eta$ is the efficiency, Q is the total energy recovered from the collector and I is the insolation, i.e., the total solar energy supplied to the collector.

Solar energy collectors fall into two categories, concentrating type collectors and flat-plate collectors. The concentrating collectors typically include a curved, e.g. parabolic, reflective surface adapted for directing the parallel solar rays to a focal line. A pipe having excellent heat transfer characteristics is placed along the focal line to absorb the concentrated solar energy along that line. The concentrating collector has the obvious disadvantage of requiring a mechanical drive and control to track the sun. Furthermore, the concentrating collector does not operate well under cloudy conditions and is relatively expensive to manufacture.

Known flat-plate solar collectors utilize either liquid or air as the fluid which is driven past the collecting elements. Flat-plate collectors of the type used with closed liquid systems to heat stored liquid in a tank have the disadvantage of being of little use when the collector temperature is less than about 10° to 20° F. from the temperature of the liquid stored in the storage tank. Furthermore, the efficiency of a liquid type collector is strongly dependent upon the temperature of the liquid in the storage tank. Air type flat plate solar collectors overcome some of the disadvantages of the liquid type collectors; however, the low heat capacity of the air coolant necessitates the use of cumbersome and expensive energy storage means, e.g. a large volume of rocks located below the building. Furthermore, the air type collectors are inefficient in comparison to liquid-type collectors.

A review of the art shows that there is an acute need for a solar energy collector that may be used when the temperature of the stored liquid is only slightly higher than the collector temperature where, according to prior art practices, it has been uneconomical to drive the liquid through the collector to attain the relatively small temperature increase in the liquid.

SUMMARY OF THE INVENTION

According to the present invention there is provided a novel solar energy collector having a liquid coolant path for communication with a liquid storage tank in a closed liquid loop and an independent air coolant path for communication with the enclosed space of a structure to be heated. Specifically, the instant invention provides a solar energy collector which may be utilized on sunny days to simultaneously raise the temperature of the liquid in the storage tank and heat the enclosed space by directing air through the collector and into the enclosed space. The solar energy collector includes:

(a) an enclosed structure having a frontal window surface for admitting solar rays;
(b) solar energy collection elements located behind said window surface for exposure to solar rays;
(c) means providing a liquid coolant path located within said structure and being in heat transfer communication with said collection elements;
(d) liquid inlet and outlet means in communication with said liquid coolant path, said liquid inlet and outlet means being adapted for connection in a closed liquid system including a liquid storage tank with associate heat exchanger;
(e) means providing an air coolant path located within said structure and being heat transfer communication with said collection elements; and
(f) air inlet and outlet means in communication with said air coolant path, said air inlet and outlet means adapted for communication with an enclosed space to be heated.

The liquid and air coolant paths may comprise a series of parallel tubes connected at their ends to headers. In a particular embodiment, the collection elements comprise aluminum fins which are held in heat transfer relation with the coolant paths.

In another embodiment the solar energy collector is of the double glazing space type defining an air gap between substantially parallel windows wherein the air gap serves as the air coolant path.

In yet another embodiment the enclosed structure of the collector defines a single enclosed volume and the air inlet and outlet means comprise a pair of openings formed in the structure walls so that the single volume may serve as the air coolant path.

In still another embodiment, the air coolant path is defined by an air manifold or "sandwich" placed below the liquid coolant path.

According to the present invention there is also provided a novel method of collecting and utilizing solar energy comprising the steps of:

(a) positioning a solar energy collector in the path of solar radiation, the collector having separate liquid and air coolant paths, the liquid path communicating with a liquid storage tank in a closed loop and the air path communicating with the enclosed space of a structure to be heated;
(b) at selected times when the differential between the collector temperature and the temperature of the stored liquid is in excess of a predetermined value, forcing air through the air path to directly provide heated air to the structure and simultaneously pumping liquid through the closed liquid loop to raise the temperature of the liquid in the tank; and
(c) at selected times when the temperature differential is less than the predetermined value and the collector temperature is greater than the temperature within the enclosed space, forcing air through the air path to directly provide heated air to the structure while not pumping liquid through the closed loop.

According to the novel method of the invention, air may be forced through the collector at times when the temperature differential between the collector and the stored liquid would be insufficient to justify pumping the liquid through the closed loop. At other times, when the temperature differential is great enough to justify pumping liquid through the collector, for example where the temperature differential is greater than about 10° to 20° F., both the air and liquid systems may be utilized whereby the enclosed space is directly heated by the air and the liquid is used solely to raise the temperature of the stored liquid. The efficiency of the system is thereby markedly greater than that achieved with conventional liquid type flat-plate solar collectors.

According to the present invention there is also provided a novel system for collecting and utilizing solar energy for use in heating the enclosed space of a structure. The system comprises:

(a) a solar energy collector located on or proximate the structure, said collector including enclosed solar energy collection elements and independent liquid and air coolant paths in heat transfer communication with the collection elements;

(b) a storage tank and associated liquid transfer conduits defining, in combination with said liquid coolant path, a closed liquid loop;

(c) means for pumping liquid through said loop;

(d) heat transfer means associated with said storage tank for transferring stored energy in the tank to the enclosed space at selected times;

(e) air transfer conduits in communication with said air coolant path and having intake and discharge portions in communication with the enclosed space to be heated; and (f) means for forcing air through said air transfer conduits and air coolant path.

Accordingly, it is a principal feature of the present invention to provide a solar energy collector having a housing enclosing solar energy collection elements wherein the collection elements are in heat transfer communication with both a liquid coolant path and an air coolant path.

It is a further feature of the present invention to provide a solar energy collector of the flat-plate type wherein the liquid and air coolant paths comprise parallel tubes connected at their ends to respective pairs of headers disposed substantially perpendicular to the tubes. One aspect of this feature is that the collection elements may comprise fins having openings for receiving the tubes.

It is still a further feature of the present invention to provide a method of collecting and utilizing solar energy wherein a solar energy collector of the type having both liquid and air coolant paths is used to enhance the efficiency of a solar energy heating system. One aspect of this feature is that on sunny days when the collector temperature is well in excess of the stored liquid temperature, the air forced through the collector may be utilized to heat the structure while the liquid pumped through the collector may be utilized solely for the purpose of increasing the temperature of the liquid in the storage tank. Another aspect of this feature is that during cloudy and/or cold conditions where the collector temperature is less than or only slightly in excess of the temperature of the stored liquid but still in excess of the temperature within the structure, air may be forced through the collector to heat the enclosed space of the structure.

Still further features and advantages of the present invention will become apparent from the following more detailed description thereof in connection with the following description of the preferred embodiments.

BRIEF DESCRIPTION OF THE DRAWINGS

FIG. 1 illustrates the solar energy collection system of the present invention comprising a solar energy collector secured to the roof of a building, a closed-loop liquid system and a forced air system.

FIG. 2 is a top view of the collector illustrated in FIG. 1 showing, through the window, the fins, liquid tubes, air tubes and headers.

FIG. 3 is a section view taken substantially along line 3—3 of FIG. 2.

FIG. 4 is a section view of an alternative form of the solar energy collector wherein the air gap of a double glazing type collector is utilized as the air coolant path.

FIG. 5 is a section view of another alternative form of the solar energy collector of the invention wherein the air transfer path comprises an air manifold or "sandwich" disposed below the liquid core of the collector.

FIG. 6 is a view of still another alternative embodiment wherein the air coolant path is defined by the single enclosed volume of the structure and wherein the air inlet and outlet means comprise a pair of openings formed in the collector sidewalls.

DETAILED DESCRIPTION OF THE PREFERRED EMBODIMENT

The preferred embodiment of the present invention will now be described with reference to FIGS. 1-3. FIG. 1 is a simplified view of a system 10 for collecting and utilizing solar energy for space heating and/or cooling. System 10 includes a structure 12, e.g. a building, which supports a solar energy collector 16 positioned with its window facing to receive an optimum amount of solar energy. In accordance with the present invention, collector 16 includes both a liquid coolant path and an air coolant path. Each coolant path communicates with an inlet and an outlet.

The liquid inlet 20 of the collector is connected to the base of a liquid storage tank 22 by means of a conduit 24. The liquid outlet 28 of the collector communicates with the upper portion of tank 22 by means of a conduit 32. Thus, it can be seen that conduits 24 and 32, the internal liquid path of collector 16 and tank 22 form a closed liquid loop which is utilized to raise the temperature of the liquid within tank 22 at times when the temperature differential between the collector and the liquid in tank 22 is such that pumping a liquid through the loop is desirable, for example, where the collector temperature is at least about 10° to 20° F. greater than the temperature of the stored liquid. A heat exchanger 36 is associated with tank 22 for transferring stored thermal energy within tank 22 for space heating, water heating or the like. As shown in FIG. 1, a pump 40 is provided in the liquid loop as a means for pumping liquid through the loop.

System 10 also includes means for direct space heating by forcing air through an internal air coolant path within collector 16. As shown in FIG. 1, the air inlet 44 of collector 16 is connected to a blower 48 by means of a conduit 50. The air outlet 52 of collector 16 communicates with a heated air discharge 56 by means of a conduit 60. Thus, it can be seen that by actuation of blower 48 air at room temperature ($T_r$) is forced through conduit 50 and heated within the internal air path within collector 16 so that the air so heated may be transferred through conduit 60 to discharge 56.

In accordance with the present invention, the total efficiency of a conventional solar collector used for space heating is greatly increased by incorporating a flow of air in addition to a flow of liquid. Thus, the space may be directly heated from discharge 56 even during conditions where the collector temperature ($T_c$) is lower than that of the liquid in the storage tank 22, provided that the collector temperature is above the room temperature ($T_c > T_r$). This condition may be encountered on cold, cloudy winter days and also during morning and late afternoon hours. Therefore, at any time when space heating is desired and the collector temperature is greater than the room temperature, blower 48 may be actuated to directly heat the space. This direct air heating may be accomplished regardless of the temperature differential between the collector and the stored liquid.

During daylight hours on sunny days the collector temperature will typically exceed the stored liquid temperature ($T_w$) by an amount such that the stored liquid temperature may be efficiently raised by operation of pump 40. However, as opposed to the prior practice use of a liquid-only collector wherein the space heating is accomplished solely by heat exchanger 36, the pumped liquid may be utilized solely to raise the temperature of the stored liquid while the space may be directly heated from discharge 56. Therefore, the stored liquid may be heated to a greater temperature than otherwise possible while the space remains heated during daylight hours. When the collector temperature drops, heat exchanger 36 may be utilized to maintain a comfortable room temperature during evening, night and morning hours.

The description will now turn to a detailed description of the preferred embodiment of the solar energy collector with particular reference to FIGS. 2-3. Collector 16 is a substantially box-shaped, flat-plate solar collector having a window 66 for passing solar rays to the enclosed collection elements. As best shown in FIG. 2, the internal portion of collector 16 underlying window 66 comprises a plurality of parallel, alternating water tubes 68 and air tubes 70. The tubes are substantially parallel and terminate at their ends in water and air headers. Water headers 73, 74 are positioned somewhat above air headers 75, 76. Liquid inlet 20 is formed in communication with header 73 while liquid outlet 28 is in communication with header 74. Air inlet 44 is formed in communication with header 76 and air outlet 52 is in communication with header 75.

As best shown in FIG. 3, the liquid and air transfer tubes pass through the energy collection elements, which, in the illustrated embodiment, are aluminum fins 80. Preferably, the fins are secured to the tubes at the openings to provide excellent heat transfer between the tubes and the fins. It will be appreciated that other materials and configurations for the collection elements may be used.

EXAMPLE

A solar collector having the general configuration illustrated in FIGS. 2-3 was constructed by modification of a liquid type, flat-plate collector manufactured by Electra Ltd., of Tel Aviv, Israel under Model No. EC-2. Initial tests before modification were conducted on a spring day at approximately midday with 100% cloudiness but distinct shadows. With water only flowing through the collector, it was found that the inlet temperature ($T_{in}$) was 22° C., the outlet temperature ($T_{out}$) was 29° C. with an ambient temperature ($T_a$) of 21° C. The initial test was repeated but in addition air by means of suction was flowing through the air coolant path at an estimated rate of approximately 300 liters per minute (300 l.p.m.). The following results were obtained:

| | Water | |
|---|---|---|
| $T_{in} = 23°$ C. | $T_{out} = 29°$ C. | $T_a = 21°$ C. |
| | Air | |
| $T_{in} = 21°$ C. | $T_{out} = 30°$ C. | $T_a = 21°$ C. |

A third test was conducted shortly thereafter on the same day utilizing both water and air flow with the flow rate of the water increased to six l.p.m. The results were:

| | Water | |
|---|---|---|
| $T_{in} = 22.5°$ C. | $T_{out} = 24°$ C. | $T_a = 21°$ C. |
| | Air | |
| $T_{in} = 22°$ C. | $T_{out} = 32°$ C. | $T_a = 21°$ C. |

The double purpose air-liquid collector proved successful since the heat flow between the liquid transfer pipes is not, in any case, 100% efficient. The temperature gradient thus developed causes heat losses which may be minimized by introducing air transfer tubes in between the liquid transfer tubes. The transfer of heat to the air within the air transfer tubes occurs even where an optimum number of liquid transfer tubes have been included in the collector. It has been found that, primarily due to the relatively low heat capacity of air, very little effect on the liquid's temperature occurs when air is flowing simultaneously within the collector. Therefore, the air may be used directly for space heating whenever possible, i.e., during daylight hours, without significantly affecting the ability of the liquid system to store energy in a liquid storage tank. At times when the collector is of no use for the liquid system, it may still be used for direct heating of space by air provided only that the collector temperature is in excess of the room temperature.

ALTERNATIVE EMBODIMENTS

A first alternative embodiment of a solar energy collector constructed in accordance with the present invention will be described with reference to FIG. 4. FIG. 4 is a section view of a collector wherein the air gap 88 of a double glazing type collector 90 is utilized as the air coolant path. Double glazing type collectors are typically utilized in climates having very cold and windy conditions wherein the heat lost through the window must be reduced by a double-glass pane configuration with an insulating air gap between the panes. According to the embodiment illustrated in FIG. 4, the sidewalls of the collector are provided with a pair of inlet and outlet openings (only one shown) communicating with the air gap so that the air gap may serve as the air coolant path. It should be noted that the accumulation of dust and debris between the glass sheets may be minimized by using proper filtering elements (not shown) in the inlet and outlet lines communicating with the air gap. Furthermore, in order to avoid hazardous breakage of the glass sheets, the air pressure in the air gap should be kept close to atmospheric pressure. Although the embodiment illustrated in FIG. 4 has the advantage of being a relatively inexpensive modification of a liquid type, flat-plate double glazing collector, this embodiment will not be effective when the temperature in the air gap is lower than the room temperature. This condition may be expected to exist during portions of the winter season.

A second alternative embodiment of the solar energy collector of the present invention is illustrated in FIG. 5. FIG. 5 shows in section view a substantially box-shaped, flat-plate collector 95 having the usual liquid transfer tubes 98 (liquid core) and associated headers wherein an auxiliary air manifold or "sandwich" 100 is provided below the liquid transfer tubes to serve as the air coolant path. This configuration has the advantage that heat is transferred to the air in the air manifold at a hot point in the collector. Furthermore the system illustrated in FIG. 5 is essentially dust-proof and presents no breakage hazard. Due to the weight of the air manifold material, this embodiment is heavier than conventional collectors and somewhat more expensive to manufacture.

FIG. 6 illustrates a third alternative embodiment wherein the sidewalls of a conventional liquid type, flat-plate solar collector 110 is provided with an inlet opening 112 and an outlet opening 114 so that the enclosed space around the liquid transfer tubes may be utilized as the air coolant path. Stated differently, the enclosed volume within the collector is utilized to capture heat which would otherwise be lost. This embodiment has the advantage of being relatively easy to implement in that it requires only simple modification of most conventional liquid type collectors. However, as with the embodiment illustrated in FIG. 5, the air pressure within the collector must be kept close to atmospheric pressure in order to avoid hazardous breakage of glass. Furthermore, filter elements (not shown) in the inlet and outlet lines should be utilized to prevent the accumulation of dust and debris within the collector. It should be pointed out that the structure of the embodiment illustrated in FIG. 6 may not be utilized with collectors having internal insulation materials that release toxic fumes when heated, for example, collectors with certain polyurethane or like insulation material.

While the present invention has been disclosed in connection with several illustrated embodiments, it will be apparent to those skilled in the art that numerous modifications may be made without departing from the spirit or scope of the instant invention. For example, it will be appreciated that the forcing of air through the air conduits may be accomplished by a blower, suction means or other suitable means. Also, the invention may be utilized with collectors having absorbers differing from the typical tube/fin type, for example, a collector utilizing a rolebond type absorber unit having integrally liquid and air paths formed by opposed metal sheets. Although water is disclosed as the preferred liquid for use in the closed loop, it will be appreciated that other liquids may be used. Additives such as antifreeze and corrosion inhibitors may be added to the liquid. Furthermore, although the differential between the collector and the stored liquid will typically be in excess of 10° to 20° F. to justify pumping of fluid through the system, it will be appreciated that the required temperature differential will vary according to characteristics of the collector and the pumping system. Therefore, the temperature differential needed to justify the pumping of liquid through the closed path may be chosen as any predetermined value. These and other variations are within the spirit and scope of the present invention.

I claim:

1. A method of collecting and utilizing solar energy comprising the steps of:

positioning a solar energy collector in the path of solar radiation, the collector having separate liquid and air coolant paths, the liquid path communicating with a liquid storage tank in a closed loop and the air path communicating with a heat receiving area;

at selected times when the differential between the collector temperature and the temperature of the stored liquid is in excess of a predetermined value, forcing air through the air path to directly provide heated air to the heat receiving area and simultaneously pumping liquid through the liquid path to raise the temperature of the liquid in the tank; and at selected times when the temperature differential is less than the predetermined value and the collector temperature is greater than the temperature within the heat receiving area, forcing air through the air path to directly provide heated air to the heat receiving area while not pumping liquid through the closed loop.

2. A method as claimed in claim 1 wherein the predetermined value of the temperature differential is in the range of about 10° to 20° F.

3. A method as claimed in claim 1 wherein the heat receiving area is the enclosed space of a structure to be heated.

* * * * *